United States Patent [19]

Tzikas et al.

[11] Patent Number: 5,480,976
[45] Date of Patent: Jan. 2, 1996

[54] REACTIVE DYES CONTAINING A VINYLSULFONYL-SUBSTITUTED 2-AMINONAPHTHALENE COUPLING COMPONENT AND A HALOACRYLOYLANILINE DIAZO COMPONENT OR THE LIKE

[75] Inventors: Athanassios Tzikas, Pratteln; Claudia Carisch, Reinach, both of Switzerland

[73] Assignee: Ciba-Geigy Corporation, Tarrytown, N.Y.

[21] Appl. No.: 320,085

[22] Filed: Oct. 7, 1994

[30] Foreign Application Priority Data

Oct. 12, 1993 [CH] Switzerland ............... 3073/93

[51] Int. Cl.⁶ .............. C09B 62/47; C09B 62/507; D06P 1/384
[52] U.S. Cl. .............. 534/642; 534/643; 8/549
[58] Field of Search .............. 534/642, 643

[56] References Cited

U.S. PATENT DOCUMENTS

| | | | |
|---|---|---|---|
| 2,374,157 | 4/1945 | Kvalnes | 534/643 X |
| 3,925,351 | 12/1975 | Meininger et al. | 534/642 |
| 4,560,388 | 12/1985 | Rohrer | 534/642 X |
| 4,703,112 | 10/1987 | Mischke et al. | 534/642 |
| 4,885,360 | 12/1989 | Scheibli | 534/642 |
| 5,391,718 | 2/1995 | Tzikas et al. | 534/642 X |
| 5,424,405 | 6/1995 | Adam et al. | 534/642 |

FOREIGN PATENT DOCUMENTS

| | | |
|---|---|---|
| 0131545 | 1/1985 | European Pat. Off. . |
| 0470930A1 | 2/1992 | European Pat. Off. . |
| 0559617 | 9/1993 | European Pat. Off. . |
| 2163389 | 6/1973 | Germany . |

*Primary Examiner*—Johann Richter
*Assistant Examiner*—Fiona T. Power
*Attorney, Agent, or Firm*—Kevin T. Mansfield

[57] ABSTRACT

Reactive dyes of formula

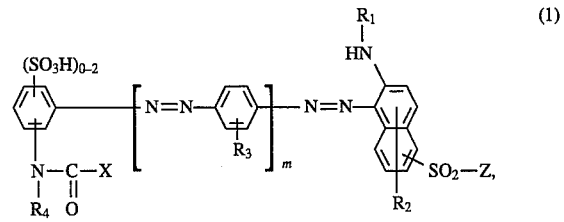

wherein X, Z, $R_1$, $R_2$, $R_3$, $R_4$ and m are as defined in claim 1, are particularly suitable for dyeing or printing cellulosic fiber materials or natural or synthetic polyamide fiber materials in high tinctorial yield, and give dyeings and prints with good fastness properties.

16 Claims, No Drawings

REACTIVE DYES CONTAINING A VINYLSULFONYL-SUBSTITUTED 2-AMINONAPHTHALENE COUPLING COMPONENT AND A HALOACRYLOYLANILINE DIAZO COMPONENT OR THE LIKE

The present invention relates to novel reactive dyes, to the preparation thereof and to the use thereof for dyeing or printing fiber materials.

The practice of dyeing with reactive dyes has given rise in recent times to more stringent requirements being made of the quality of the dyeings and to the economy of the dyeing process. For this reason, there is still a need for novel reactive dyes with improved properties, especially application properties.

At the present time it is necessary to provide reactive dyes which have sufficient substantivity and which at the same time have good washing off properties with respect to unfixed dye. The dyes shall have a good tinctorial yield and high reactivity, and they shall also give dyeings with high fixation. The dyes of the prior art do not meet these requirements in all respects.

The present invention therefore has for its object to provide novel improved reactive dyes for dyeing and printing fiber materials and which have the above specified qualities to a high degree. The novel dyes shah be distinguished in particular by excellent fixation yield and superior fiber-dye bond stability, and further they shall have the property of being easily washed off to remove unfixed dye. They shall also produce dyeings with good allround properties, for example lightfastness and wetfastness.

It has been found that this object is substantially achieved with the novel reactive dyes defined below.

Accordingly, the invention relates to reactive dyes of formula

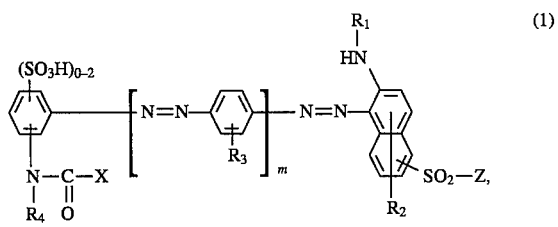

wherein

X is a radical of formula

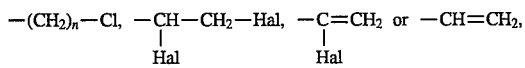

Hal is halogen, and n is 1, 2, 3 or 4,

Z is a group of formula —CH=$CH_2$ or —$CH_2$—$CH_2$—Y, and Y is a leaving group, $R_1$ and $R_4$ are each independently of the other hydrogen or unsubstituted or substituted $C_1$–$C_4$alkyl, $R_2$ is hydrogen, sulfo or hydroxy, $R_3$ is hydrogen, $C_1$–$C_4$alkyl, $C_1$–$C_4$alkoxy, $C_2$–$C_4$alkanoylamino, halogen or sulfo, and m is 0 or 1.

$R_1$, $R_3$ and $R_4$ defined as $C_1$–$C_4$alkyl may each independently of one another suitably be methyl, ethyl, propyl, isopropyl, butyl, isobutyl, sec-butyl or tert-butyl, preferably methyl.

$R_1$ defined as $C_1$–$C_4$alkyl may typically be substituted by phenyl which may itself carry further substituents such as $C_1$–$C_4$alkyl, $C_1$–$C_4$alkoxy, $C_2$–$C_4$alkanoylamino, halogen, sulfo or carboxy.

$R_4$ defined as $C_1$–$C_4$alkyl may typically be substituted by sulfo, sulfato, hydroxy, carboxy or $C_1$–$C_4$alkoxy.

$R_3$ defined as $C_1$–$C_4$alkoxy may suitably be methoxy, ethoxy, propoxy, isopropoxy, butoxy, isobutoxy, sec-butoxy or tert-butoxy. Methoxy is preferred.

$R_3$ defined as $C_2$–$C_4$alkanoylamino may typically be acetylamino or propionylamino. Acetylamino is preferred $R_3$ defined as halogen is typically fluoro, bromo or preferably chloro.

Suitable leaving groups Y are for example —Cl, —$OSO_3H$, —$SSO_3H$, —OCO—$CH_3$, —$OPO_3H_2$, —OCO—$CCl_3$, —OCO—$CHCl_2$, —OCO—$CH_2Cl$, —$OSO_2$—$C_1$–$C_4$alkyl, —$OSO_2$—N($C_1$–$C_4$alkyl)$_2$ or —OCO—$C_6H_5$.

Y is preferably a group of formula —Cl, —$OSO_3H$, —$SSO_3H$, —OCO—$CH_3$, —OCO—$C_6H_5$ or —$OPO_3H_2$, more particularly a group of formula —Cl, —$OSO_3H$ or —OCO—$CH_3$. Most preferably, Y is a group of formula —$OSO_3H$.

Hal may suitably be chloro or bromo, preferably bromo.

$R_1$ is preferably hydrogen, $C_1$–$C_4$alkyl, or benzyl which is unsubstituted or substituted by $C_1$–$C_4$alkyl, $C_1$–$C_4$alkoxy, $C_2$–$C_4$alkanoylamino, halogen, sulfo or carboxy. $R_1$ is more preferably hydrogen or $C_1$–$C_4$alkyl, and is most preferably hydrogen.

$R_2$ is preferably hydrogen or sulfo.

$R_3$ is preferably hydrogen or sulfo, most preferably sulfo.

$R_4$ is preferably hydrogen or $C_1$–$C_4$alkyl, most preferably hydrogen.

n is preferably 1.

The reactive dyes of formula (1) preferably contain at least one sulfo group, more particularly 1 to 4 sulfo groups. The reactive dyes of formula (1) most preferably contain 1 or 2 sulfo groups.

Preferred reactive dyes of formula (1) are those in which $R_1$ is hydrogen or $C_1$–$C_4$alkyl, preferably hydrogen; $R_2$ and $R_3$ are each independently of the other hydrogen or sulfo; $R_4$ is hydrogen or $C_1$–$C_4$alkyl, preferably hydrogen; Y is a group of formula —Cl, —$OSO_3H$ or —OCO—$CH_3$, preferably a group of formula —$OSO_3H$; and n is 1. The reactive dyes of formula (1) contain at least one sulfo group, preferably 1 to 4 sulfo groups.

Particularly preferred reactive dyes are those of formula

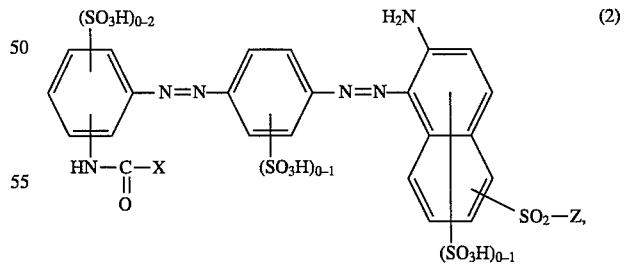

wherein X is a radical of formula

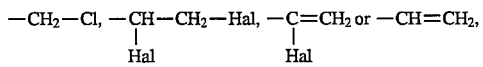

and Hal is halogen, preferably bromo, and Z is a group of formula —CH=$CH_2$ or —$CH_2$—$CH_2$—Y, and Y is a group of formula —Cl, —$OSO_3H$ or —OCO—$CH_3$, preferably a group of formula —OSO$_3$H. The reactive dyes of formula (2) contain at least one sulfo group, preferably 1 to 4 sulfo groups.

Particularly preferred reactive dyes are also those of formula

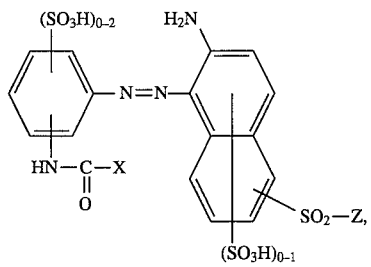

wherein X is a radical of formula

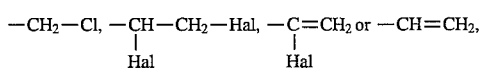

and Hal is halogen, preferably bromo, and Z is a group of formula —CH=CH$_2$ or —CH$_2$—CH$_2$—Y, and Y is a group of formula —Cl, —OSO$_3$H or —OCO—CH$_3$, preferably a group of formula —OSO$_3$H. The reactive dyes of formula (3) contain at least one sulfo group, preferably 1 to 4 sulfo groups.

In the reactive dyes of formula (1), the radical X is preferably the radical of formula

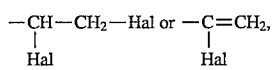

wherein Hal is chloro or bromo, preferably bromo.

The radical Z in the reactive dyes of formula (1) is preferably the group of formula —CH=CH$_2$ or —CH$_2$—CH$_2$—OSO$_3$H. The group of formula —CH$_2$—CH$_2$—OSO$_3$H is particularly preferred.

Reactive dyes of particular interest are those wherein X is a radical of formula

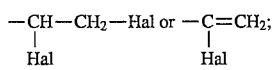

and Hal is halogen, preferably bromo; and Z is a group of formula —CH=CH$_2$ or —CH$_2$—CH$_2$—OSO$_3$H, preferably a group of formula —CH$_2$—CH$_2$—OSO$_3$H.

Reactive dyes of formula (1), wherein m is 0, are of very particular interest.

The present invention also relates to a process for the preparation of the reactive dyes of formula (1) which comprises diazotising an amine of formula

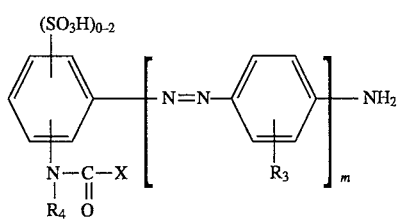

and coupling the diazonium salt so obtained to a compound of formula

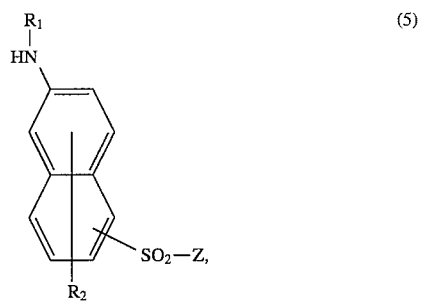

wherein X, Z, R$_1$, R$_2$, R$_3$, R$_4$ and m are as defined for formula (1).

The diazotisation of the amine of formula (4) is normally effected by treatment with nitrous acid in an aqueous solution of mineral acid at low temperature, such as 0° to 15° C., and the coupling to the coupling components of formula (5) is carried out in the acid, neutral or weakly alkaline pH range, preferably at pH 2–8.

In a modified embodiment of the process, a dye is first prepared containing a precursor of the reactive radical which is subsequently converted into the final stage, typically by esterification or by an addition reaction. Typically, a dye containing Z as a radical HO—CH$_2$CH$_2$— may be prepared, which product may then be reacted with sulfuric acid to effect conversion of the hydroxy group to the sulfato group. The sulfatation of the hydroxy group is typically effected with concentrated sulfuric acid in the range from c.0° C. to moderately elevated temperature.

In addition, the synthesis may be followed by elimination reactions. Reactive dyes of formula (1) comprising sulfatoethylsulfonyl radicals may be treated with a base such as sodium hydroxide to convert said sulfatoethylsulfonyl radicals to vinylsulfonyl radicals.

In the novel process for the preparation of the reactive dyes of formula (1), the substituents of the compounds of formulae (4) and (5) have the meanings and preferred meanings defined above.

The compounds of formulae (4) and (5) are known or can be prepared in general accordance with known processes.

The reactive dyes of formula (1) containing a sulfo or sulfato group are obtained either in the form of their free acid or, preferably, as the salts thereof. Suitable salts are typically alkali metal salts, alkaline earth metal salts or ammonium salts, or the salts of an organic amine. Typical examples are the sodium, lithium, potassium or ammonium salts, or the salt of the mono-, di- or triethanolamine.

The reactive dyes of formula (1) are suitable for dyeing and printing a very wide range of materials, such as hydroxyl group-containing or nitrogen-containing fiber materials. Typical examples of such materials are silk, leather, wool, polyamide and polyurethane, and especially cellulosic fiber materials of all kinds. Such cellulosic fiber materials are typically natural cellulosic fibers such as cotton, linen and hemp, as well as cellulose and regenerated cellulose. The reactive dyes of formula (1) are also suitable for dyeing or printing hydroxyl group-containing fibers present in blends, for example blends of cotton with polyamide fibers. In particular, the reactive dyes of formula (1) are suitable for dyeing or printing cellulosic fiber materials or, especially, natural or synthetic polyamide fiber materials.

The reactive dyes of this invention may be applied to and fixed on the fiber material in different manner, preferably in the form of aqueous dye solutions and printing pastes. The novel reactive dyes are suitable both for the exhaust process and for dyeing by the pad dyeing process, in which the goods are impregnated with aqueous dye solutions, and the dyes are fixed after treatment with alkali, or in the presence of alkali, with or without the application of heat. The dyes of this invention are particularly suitable for the so-called cold pad-batch method, which comprises applying the dye together with the alkali on the pad and subsequently fixing the dye by storing the impregnated goods for several hours at room temperature. After fixation, the dyeings or prints are thoroughly rinsed with cold and hot water, if necessary with the addition of an agent which acts as a dispersant and promotes the diffusion of unfixed dyes.

The reactive dyes of formula (1) are distinguished by high reactivity, good fixation and excellent build-up. They can therefore be applied by the exhaust process at low dyeing temperatures and require only short steaming times when used in the pad-steam process. The degree of fixation is high, and unfixed dye can be readily washed off. The difference between degree of exhaustion and degree of fixation is remarkably small, i.e. the soap loss is very small. The reactive dyes of formula (1) arc also particularly suitable for printing, especially on cotton, and for printing nitrogen-containing fibers, e.g. wool, silk or blends containing wool or silk.

The dyeings and prints obtained with the dyes of this invention have excellent tinctorial strength and excellent dye-fiber bond stability both in the acid and in alkaline medium, and they also have good lightfastness and good wetfastness properties such as fastness to washing, water, sea-water, cross-dyeing and perspiration, as well as good fastness to pleating, ironing and rubbing.

The invention is illustrated by the following Examples in which parts and percentages are by weight, unless otherwise stated. The ratio of parts by weight to pans by volume is the same as that of kilograms to liters.

EXAMPLE 1

22parts of 5-(2',3'-dibromopropionamido)aniline-2-sulfonic acid in 280 parts of a suspension of ice-water are acidified with 18 parts of concentrated aqueous hydrochloric acid and diazotised with 15.6 parts of a 5N solution of sodium nitrite. After stirring for one hour at c. 5°–15° C., excess nitrous acid is destroyed with sulfamic acid. The solution of the diazonium salt so obtained is slowly run at pH 4–5 into a suspension of 17 parts of the coupling component of formula

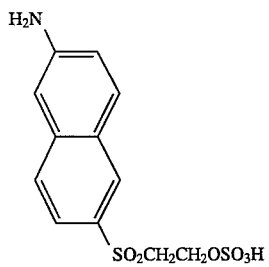

in 100 parts of water. The pH is raised to pH 6–7 by adding sodium hydrogencarbonate and the batch is stirred for 2 hours until coupling is complete. The dye is then subjected to reverse osmosis and lyophilised, giving a dye which in the form of the free acid corresponds to the compound of formula

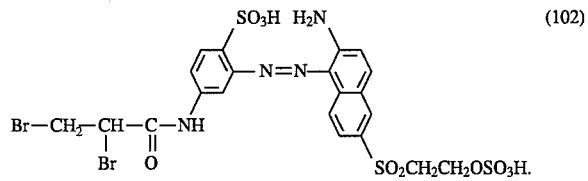

The dye of formula (102) dyes cotton and wool in a brilliant yellowish-orange shade.

EXAMPLE 2

22parts of 5-(2',3'-dibromopropionamido)aniline-2-sulfonic acid in 300 parts of a suspension of ice-water are acidified with 18 parts of concentrated aqueous hydrochloric acid and diazotised with 15.6 parts of a 5N solution of sodium nitrite. After stirring for one hour at c. 5°–15° C., excess nitrous acid is destroyed with sulfamic acid. The solution of the diazonium salt so obtained is slowly run at pH 4–5 into a suspension of 17 parts of the coupling component of formula

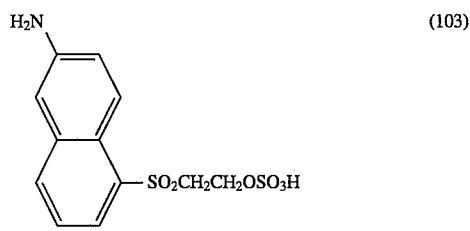

in 100 parts of water. The pH is raised to pH 6–7 by adding sodium hydrogencarbonate and the batch is stirred for 2 hours until coupling is complete. The dye is then subjected to reverse osmosis and lyophilised, giving a dye which in the form of the free acid corresponds to the compound of formula

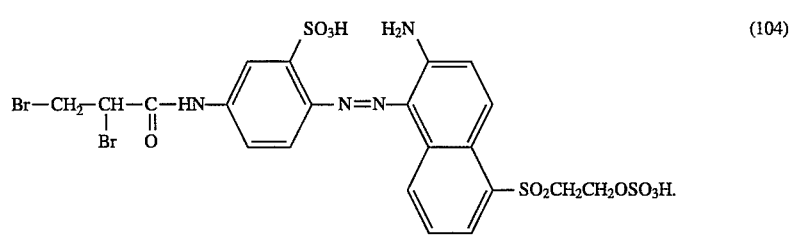

The dye of formula (104) dyes cotton and wool in a brilliant orange shade.
EXAMPLES 3 to 19
The reactive dyes of the following Table, column 2, may be obtained in general accordance with the procedure of Examples 1 and 2. They dye wool and cotton in the shades listed in column 3.
TABLE
| Ex. | Reactive dye | Shade |
|---|---|---|
| 3 | 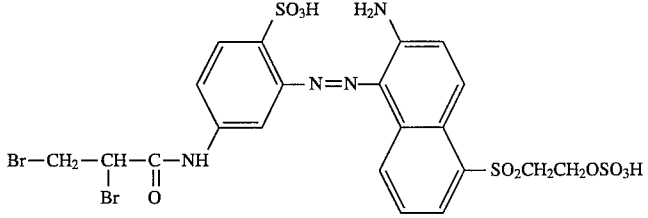 | golden yellow |
| 4 | 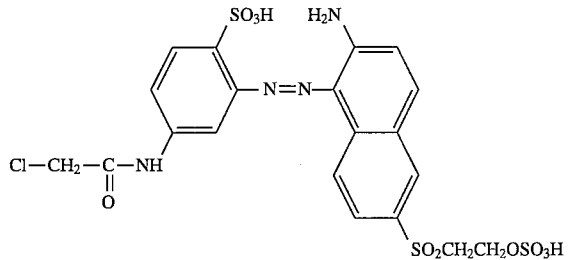 | golden yellow |
| 5 | 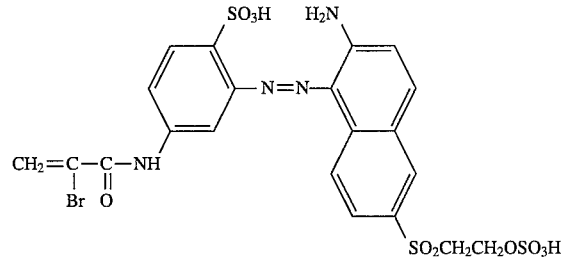 | golden yellow |
| 6 | 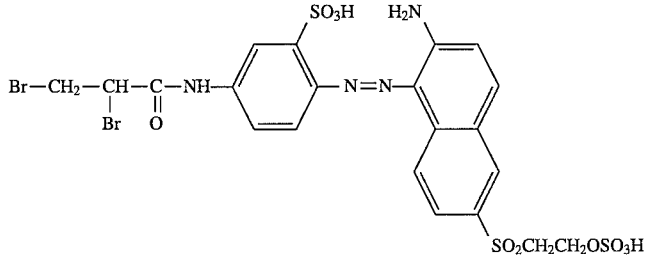 | orange |
| 7 | 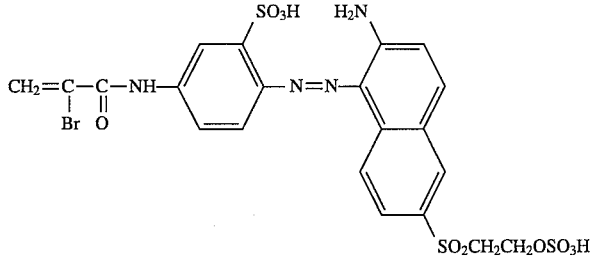 | orange |

TABLE-continued
| Ex. | Reactive dye | Shade |
|---|---|---|
| 8 | 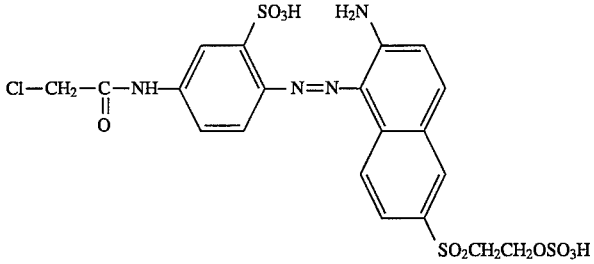 | orange |
| 9 | 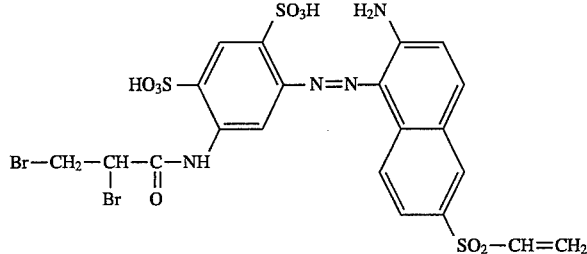 | orange |
| 10 | 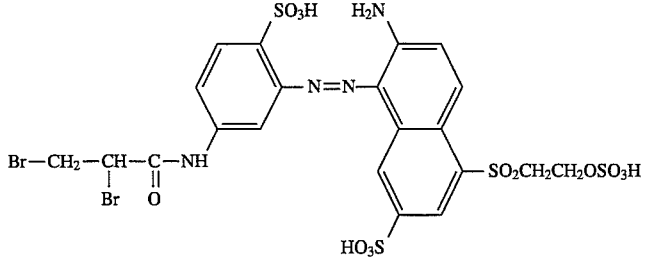 | golden yellow |
| 11 | 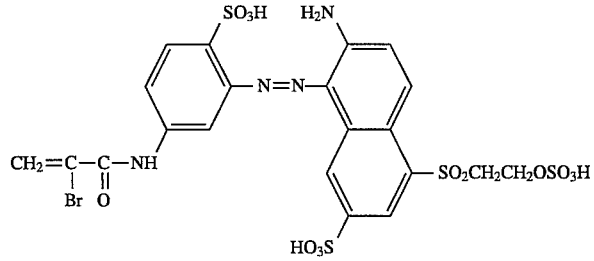 | orange |
| 12 | 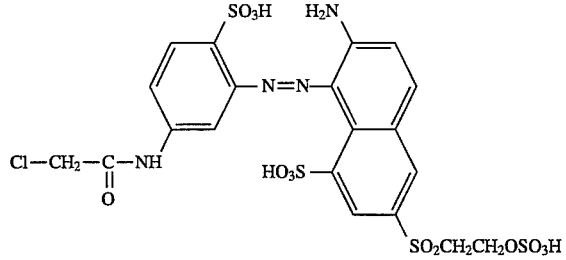 | orange |
| 13 | 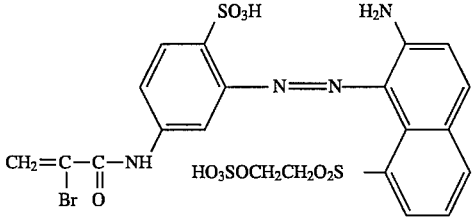 | orange |

TABLE-continued
| Ex. | Reactive dye | Shade |
|---|---|---|
| 14 | 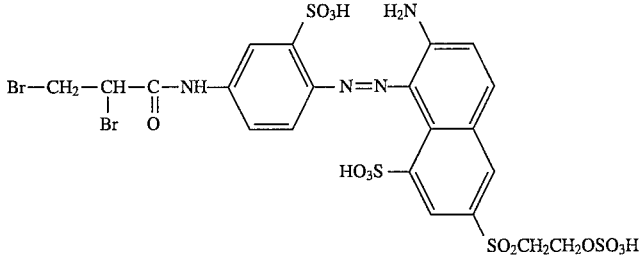 | orange |
| 15 | 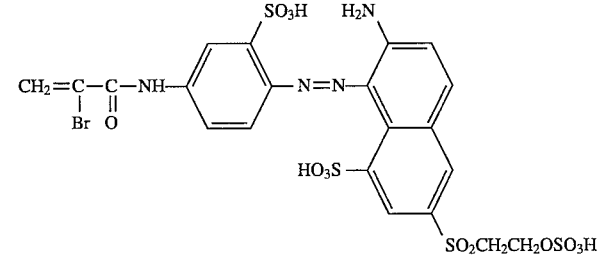 | orange |
| 16 | 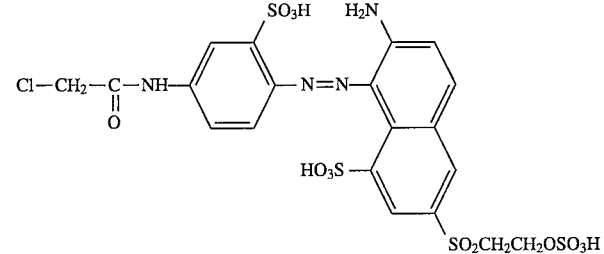 | orange |
| 17 | 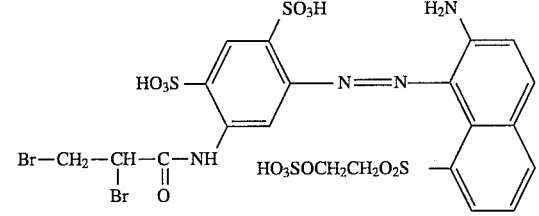 | orange |
| 18 | 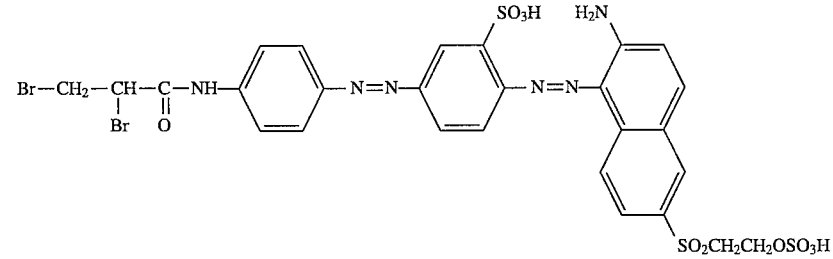 | bordeaux |
| 19 | 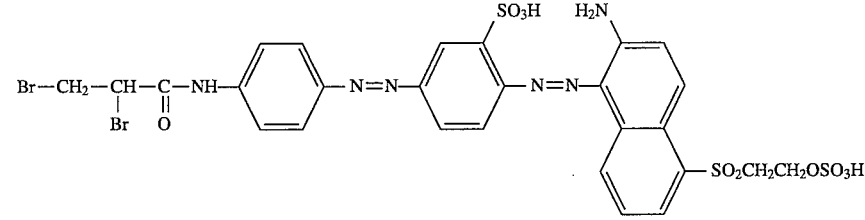 | bordeaux |
Dyeing Procedure I 2 parts of the reactive dye obtained in Example 1 are dissolved in 400 parts of water. To this solution are added 1500 parts of a solution which contains 53 g/l of sodium chloride. parts of cotton fabric are put into this dyebath at 40° C. and, after 45 minutes, 100 parts of a solution containing 16 g/l of sodium hydroxide and 20 g/l of calcined sodium carbonate are added. The temperature of the dyebath is kept for another 45 minutes at 40° C. The dyed goods are then rinsed, soaped at the boil for a quarter of an hour with a non-ionic detergent, rinsed again and dried.

Dyeing Procedure II

A dyebath is prepared from 2000 parts of water, 5 parts of sodium sulfate, 4 parts of sodium acetate, one part of a levelling agent (based on a condensate of a higher aliphatic amine and ethylene oxide) and 1.9 parts of the reactive dye obtained according to Example 1. The pH of this liquor is adjusted to 5.5 by addition of acetic acid. 100 parts of woolen fabric are put into the liquor so obtained which is then heated over 50 minutes to c. 100° C. After dyeing for 1 hour at this temperature, the dyed goods are rinsed and dried.

Printing Procedure 3 parts of the reactive dye obtained in Example 1 are sprinkled, with rapid stirring, into 100 parts of a stock thickening which contains 50 parts of 5% sodium alginate thickening, 27.8 parts of water, 20 parts of urea, 1 part of sodium m-nitrobenzenesulfonate and 1.2. parts of sodium hydrogen carbonate. A cotton fabric is printed with the printing paste so obtained and dried. The printed fabric is steamed for 2 minutes at 102° C. in saturated steam, then rinsed, if necessary soaped at the boil, then rinsed once more and subsequently dried.

What is claimed is:

1. A reactive dye of formula

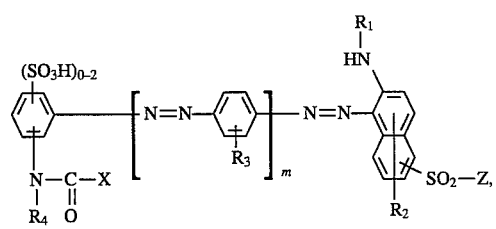

(1)

wherein

X is a radical of formula

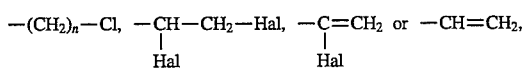

wherein Hal is halogen and n is 1, 2, 3 or 4,

Z is a group of formula —CH=CH$_2$ or —CH$_2$—CH$_2$—Y, and Y is a leaving group, R$_1$ and R$_4$ are each independently of the other hydrogen or unsubstituted or substituted C$_1$-C$_4$alkyl, R$_2$ is hydrogen, sulfo or hydroxy, R$_3$ is hydrogen, C$_1$-C$_4$alkyl, C$_1$-C$_4$alkoxy, C$_2$-C$_4$alkanoylamino, halogen or sulfo, and m is 0 or 1.

2. A reactive dye according to claim 1, wherein R$_1$ is hydrogen, C$_1$-C$_4$alkyl, or benzyl which is unsubstituted or substituted by C$_1$-C$_4$alkyl, C$_1$-C$_4$alkoxy, C$_2$-C$_4$alkanoylamino, halogen, sulfo or carboxy.

3. A reactive dye according to claim 1, wherein R$_1$ is hydrogen or C$_1$-C$_4$alkyl.

4. A reactive dye according to claim 1, wherein R$_2$ is hydrogen or sulfo.

5. A reactive dye according to claim 1, wherein R$_3$ is hydrogen or sulfo.

6. A reactive dye according to claim 1, wherein R$_4$ is hydrogen.

7. A reactive dye according to claim 1, wherein Y is a group of formula —Cl, —OSO$_3$H, —SSO$_3$H, —OCO—CH$_3$, —OCO—C$_6$H$_5$ or —OPO$_3$H$_2$.

8. A reactive dye according to claim 1, wherein n is 1.

9. A reactive dye according to claim 1, wherein m is 0.

10. A reactive dye according to claim 1, wherein the reactive dye contains at least one sulfo group.

11. A reactive dye according to claim 1, of formula

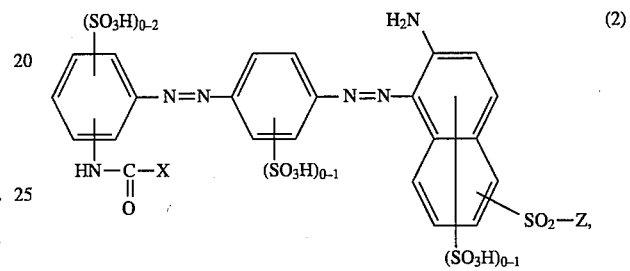

(2)

wherein X is a radical of formula

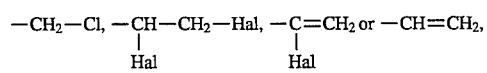

and Hal is halogen, and

Z is a group of formula —CH=CH$_2$ or —CH$_2$—CH$_2$—Y, and Y is a group of formula —Cl, —OSO$_3$H or —OCO—CH$_3$, which reactive dye of formula (2) contains at least one sulfo group.

12. A reactive dye according to claim 1, of formula

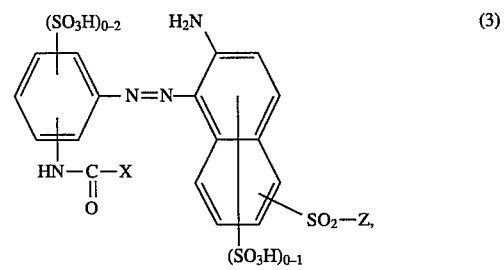

(3)

wherein X is a radical of formula

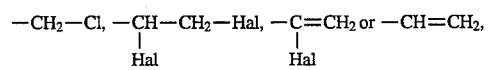

and Hal is halogen, and

Z is a group of formula —CH=CH$_2$ or —CH$_2$—CH$_2$—Y, and Y is a group of formula —Cl, —OSO$_3$H or —OCO—CH$_3$, which reactive dye of formula (3) contains at least one sulfo group.

13. A reactive dye according to claim 1, wherein Hal is bromo.

14. A reactive dye according to claim 1, wherein X is a radical of formula

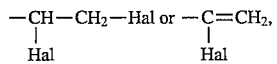

and Hal is Halogen, and

Z is a group of formula —CH=CH$_2$ or —CH$_2$—CH$_2$—OSO$_3$H.

15. A process for dyeing or printing hydroxyl group-containing or nitrogen-containing fiber material, which comprises the step of applying to said fiber material a tinctorial amount of a reactive dye according to claim 1.

16. A process according to claim 15, wherein said fiber material is cellulosic fiber material or natural or synthetic polyamide fiber material.

* * * * *